United States Patent [19]
Bosworth

[11] 3,752,540
[45] Aug. 14, 1973

[54] PRESS-TOOL SETS
[75] Inventor: Donald Frederick Bosworth, Hendon, London, N.W. 9, England
[73] Assignee: Desoutter Brothers Limited, London, England
[22] Filed: Mar. 11, 1969
[21] Appl. No.: 806,134

[30] Foreign Application Priority Data
Mar. 27, 1968 Great Britain.................. 14,819/68

[52] U.S. Cl............................................... 308/4 C
[51] Int. Cl. .............................................. F16c 1/26
[58] Field of Search...................... 29/148.4, 149.5; 308/4, 4 C, 6, 201; 184/5

[56] References Cited
UNITED STATES PATENTS
| | | | |
|---|---|---|---|
| 2,317,889 | 4/1943 | Danneman............................. | 308/4 |
| 2,774,430 | 12/1956 | Blazek .................................. | 308/4 |
| 2,906,563 | 9/1959 | Conner.................................. | 308/6 |
| 3,092,425 | 6/1963 | Conner.................................. | 308/6 |
| 3,253,868 | 5/1966 | Danly..................................... | 308/6 |
| 3,357,755 | 12/1967 | Danly..................................... | 308/6 |

Primary Examiner—Manuel A. Antonakas
Attorney—Holman & Stern

[57] ABSTRACT

A press-tool set comprising a base and a punch holder with two or more pillars upon one of said members and corresponding bores in the other member and having a linear ball bearing upon each pillar and a circumferential groove in the surface of the cage of the linear ball bearing and either upon the surface of the pillar or upon the bore and a resilient means within one of the grooves, which may be an O-ring which co-operates with the other groove to resist relative longitudinal movement between the cage and the pillar to prevent it moving out of the correct working position as the pillar is withdrawn and reinserted into the bore.

1 Claim, 1 Drawing Figure

PATENTED AUG 14 1973
3,752,540
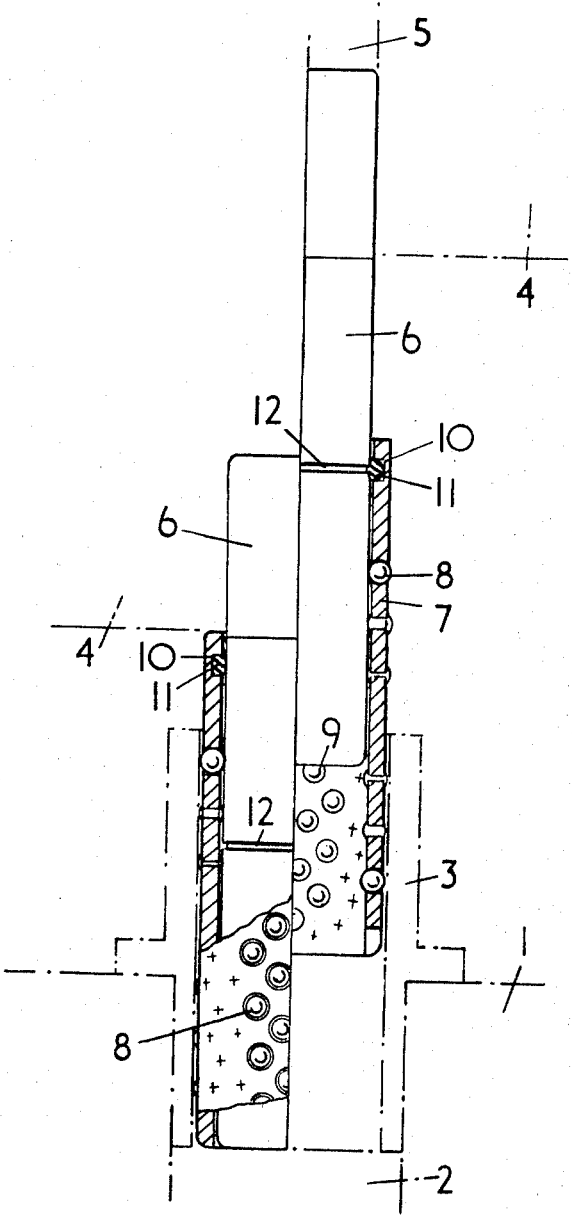
INVENTOR
DONALD FREDERICK BOSWORTH
BY Holman, Glascock,
Downing & Seebold
ATTORNEYS

PRESS-TOOL SETS

BACKGROUND OF THE INVENTION

The invention relates to press-tool sets and in particular to the guide means for controlling the movement of a punch holder relative to the base of the set.

It is known to provide a press-tool set comprising a base, and a punch holder with two or more parallel pillars upon the base, or the punch holder, the other member having a corresponding number of bores therein, usually formed in bushes, and to provide each bore and pillar with a linear ball bearing, by means of which the two members are movable relative to one another with minimum friction and in a truly rectilinear path.

The linear ball bearing may comprise a cage with balls which, on the outer side of the cage, bear upon the inner surface of the bore, and on the inner side of the cage, bear upon the surface of the pillar, so as to be movable freely longitudinally of the pillar and the bore where the punch holder is moved towards and away from the base.

In order for the balls to contact the two surfaces, and yet allow freedom for the cage to move, the thickness of the wall of the cage is naturally made less than the diameter of the balls.

When the punch holder and the base have to be separated in order to replace a punch or substitute a different one, the pillars have to be withdrawn from the bores, and in so doing the linear ball bearing becomes free to move upon the pillar or in the bore, in consequence of there being only an inner or outer surface, and the balls become free. When the press-tool set is re-assembled, it is vitally important that the linear bearing should occupy the correct linear relationship with the bore and the pillar, otherwise the balls will not make a rolling contact with the surface upon the bore and the pillar throughout the whole of the stroke during the re-assembly process, and scoring of the surface is likely to take place.

Also, when such a linear ball bearing is fitted to a press operated with a long stroke, the relationship between the pillars and bushes may alter to such an extent that the balls of the cage become disengaged from both the pillar and the bore, and the cage does not continue its linear motion, and adopts an incorrect relative position when the return stroke takes place.

The object of the present invention is to overcome the above disadvantages, and to ensure that the linear bearing adopts its correct position relative to the bore and the pillar during the re-assembly process, and when the pillars enter the bore when operating on a long stroke press.

SUMMARY OF THE INVENTION

The invention consists in a press-tool set comprising support means defined by a base and a punch holder and guide members defined by at least two pillars upon one of the support members members and corresponding bores in the other support member, and a linear ball bearing including a cage and balls between each pillar and its bore characterized in that there is provided a circumferential groove in the surface of the cage of the linear ball bearing and the surface of the adjacent guide member, one of which contains resilient means cooperable with the other groove to resist relative longitudinal movement between the cage and the adjacent guide member, out of the correct working position, where the balls are in rolling contact with both pillar and the base, as the pillar is withdrawn and reinserted into the bore.

The invention further consists in a press-tool set as set forth in the preceding paragraph in which the grooves are formed in the outer surface of the cage and the inner surface of the bore respectively.

The invention still further consists in a press-tool set as set forth above in which the resilient means is an O-ring.

The invention still further consists in a press-tool set as set forth above in which the resilient means is a helical spring or a resilient split-ring construction in one or more parts.

BRIEF DESCRIPTION OF THE DRAWINGS

The accompanying drawing shows in cross-section, by way of example only, to the left of the FIGURE the punch holder in its lowered position and to the right of the FIGURE the punch holder in its raised position, and showing one embodiment of the invention.

DETAILED DESCRIPTION OF THE INVENTION

The embodiment includes a press-tool set having a base 1 provided with a bore 2 in which is press fitted a bush 3. Above the base, and movable towards and away from the base, to operate the tool, is a punch holder 4 having a bore 5 co-axial with the bore 2, and into which is press fitted a pillar 6, and which is movable precisely axial with the bush 3 by means of a linear ball bearing.

The ball bearing comprises a cylindrical cage 7 having radial holes therethrough which form pockets for balls 8, and in which such balls are freely rotatable, and from which they are unable to escape, seeing that each end of each pocket is of smaller diameter than the respective ball.

The pillar 6, the cage 7 and the bush 3, to the right of the FIGURE, are in the relative positions they adopt when the punch holder is elevated to its maximum operating position, namely, as the ball 9 of the uppermost row of balls to engage in rolling contact both the inner surface of the bush 3 and the outer surface of the pillars 6, becomes free from the pillars 6. If the punch holder 4 were lifted away, the ball race would become free and fall into the bush 3, were it not for the fact that in accordance with the present invention means is provided to retain the ball race upon the pillar 6 in this position.

The retaining means comprises a circumferential groove 10 in the inner surface of the cage, which is fitted with a resilient O-ring 11, for example of "Neoprene" (R.T.M.), which enters a small circumferential groove 12 in the exterior surface of the pillar at the appropriate point. When the punch holder 4 is lifted away, the linear bearing is retained in the pillar 6 in the correct position for re-insertion of the pillar 6 into the bush 3.

The circumferential groove 10 is positioned close to the upper end of the cage 7 for ease of manufacture, but can be positioned further in if desired, and the groove 12 positioned on the pillar 6 accordingly.

The grooves may alternatively be formed on the exterior surface of the cage and the inner surface of the bore.

The arrangement is equally applicable to pillars on the base and the bores in the punch holder as to pillars on the punch holder and bores in the base.

In an alternative form of construction the O-ring may be substituted by a helical spring or a resilient split-ring construction in one or more parts lying within the groove of one of the members engage in the groove of the other member.

It is to be understood that the above description is by way of example only, and that details for carrying the invention into effect may be varied without departing from the scope of the invention claimed.

I claim:

1. A press-tool set comprising support members defined by a base and a punch holder and guide members defined by at least two pillars upon one of said support members and corresponding bores in the other support member, and a linear ball-bearing including a cage and balls between each pillar and its bore for reciprocating movement in respect of each other during the operation of the press-tool, the improvement including a circumferential groove in the surface of the cage of the linear ball-bearing and a second circumferential groove in the surface of the adjacent guide member, said grooves being in adjacent surfaces of the cage and the adjacent guide member, one of which grooves contains under tension an unbroken O-ring of resilient material such as an elastomer, the grooves being positioned relative to one another such that during a normal operation of the tool press they do not become aligned with one another, but as the pillar is withdrawn from said bore, the grooves become aligned, and the O-ring cooperates directly with the other groove to resist relative longitudinal movement between the cage and the adjacent guide member out of the correct working position where the balls are in rolling contact with both the pillar and the bore.

* * * * *